United States Patent

[11] 3,579,219

| [72] | Inventor | Bodo M. Wolfframm<br>Claredon Hills, Ill. |
|---|---|---|
| [21] | Appl. No. | 776,893 |
| [22] | Filed | Nov. 19, 1968 |
| [45] | Patented | May 18, 1971 |
| [73] | Assignee | Sola Basic Industries, Inc.<br>Milwaukee, Wis. |

[54] LEAKAGE-CURRENT DETECTOR
11 Claims, 3 Drawing Figs.

[52] U.S. Cl. .................................................. 340/255,
250/214
[51] Int. Cl. ..................................................... G08b 21/00
[50] Field of Search............................................ 340/255,
413, 327; 317/17, 18; 307/94, 311; 250/214
(Inquired); 328/2 (Cursory)

[56] References Cited
UNITED STATES PATENTS

| 2,700,125 | 1/1955 | King et al...................... | 340/255X |
| 2,942,249 | 6/1960 | Paull ............................ | 340/327X |
| 3,066,284 | 11/1962 | McKinley et al............... | 340/255 |
| 3,141,156 | 7/1964 | Freedman et al.............. | 340/255 |
| 3,433,962 | 3/1969 | Neiger.......................... | 307/311X |

Primary Examiner—John W. Caldwell
Assistant Examiner—Daniel Myer
Attorney—Smythe and Moore ABSTRACT: A leakage current or fault detector for isolated power lines in which independent detection circuits each including identical R-C networks operate sequentially from each line to ground. Any fault is fed into a magnetic summing amplifier which is of the fail-safe type and drives an indicating relay. The fault may be either capacitive or resistive, or both, and is detected on either or both lines, including a symmetrical fault. The detection circuits may be sequentially sampled by electronically operated photosensitive devices.

LEAKAGE-CURRENT DETECTOR

This invention relates to leakage-current detectors and more particularly to a leakage-current or ground-fault detector for use in hospital operating rooms or the like.

In areas where there is danger of explosion from gases or shock to personnel using fixed or portable electric equipment, such as in a hospital operating room, the electrical code provides for the use of isolated or ungrounded power lines which are also isolated from the usual grounded power system, such latter isolation being usually provided by an isolation transformer. The code also requires the provision of leakage-current detectors presently set to indicate a leakage current of 2 ma. or more. While detectors for this purpose have previously been proposed, such detectors in general have comprised sensitive relays connected between the isolated lines and ground and present the difficulty of adjusting and maintaining proper adjustment of sensitivity. Such detectors, furthermore, are unable to monitor leakage currents, particularly due to capacitive coupling of lines or apparatus to ground, which appear equally from both lines, i.e. any combination of capacitive or resistive leakage current which exists from both power lines simultaneously.

An object of the present invention is to provide a leakage-current detector in which problems of sensitivity and maintenance of sensitivity are reduced to a minimum.

A further object is the provision of a leakage-current detector which detects capacitive as well as resistive leaks, or both, whether occurring in any one line or in a plurality of lines simultaneously.

A further object is the provision of a leakage-current detector in which independent detecting circuits are switched to ground sequentially to sample each detecting circuit.

A further object is to provide a fail-safe leakage-current or fault detector.

A further object is to provide a leakage-current detector in which a magnetic amplifier controlled by independent sampling circuits provides for giving a fault signal.

A further object is the provision of a leakage-current detector in which independent detecting circuits are sequentially sampled by photosensitive switching devices.

A still further object is the provision of electronic circuit means for effecting sequential sampling of leakage-current detecting circuits.

In the main aspect of the invention, separate detection circuits, each having an identical resistance-capacitance network connected therein are connected to each of a plurality of isolated power lines. A switching means sequentially connects each of the detection circuits to ground whereby a fault in one or more lines will cause a small leakage current to flow in the detection circuit then connected to ground. This current passes through a central winding on a magnetic amplifier which operates in a bistable mode through positive feedback and effects, upon triggering, the deenergization of a relay controlling a fault-indicating signal.

In a second aspect, the sequentially operated switching means comprises photosensitive cells or devices, one for each detection circuit, which are operated by neon lamps forming part of the circuit of a free-running multivibrator.

The above and other objects, advantages and aspects of the invention will be apparent from the following description and accompanying drawings which describe and illustrate exemplary embodiments of the invention.

Figure 1:
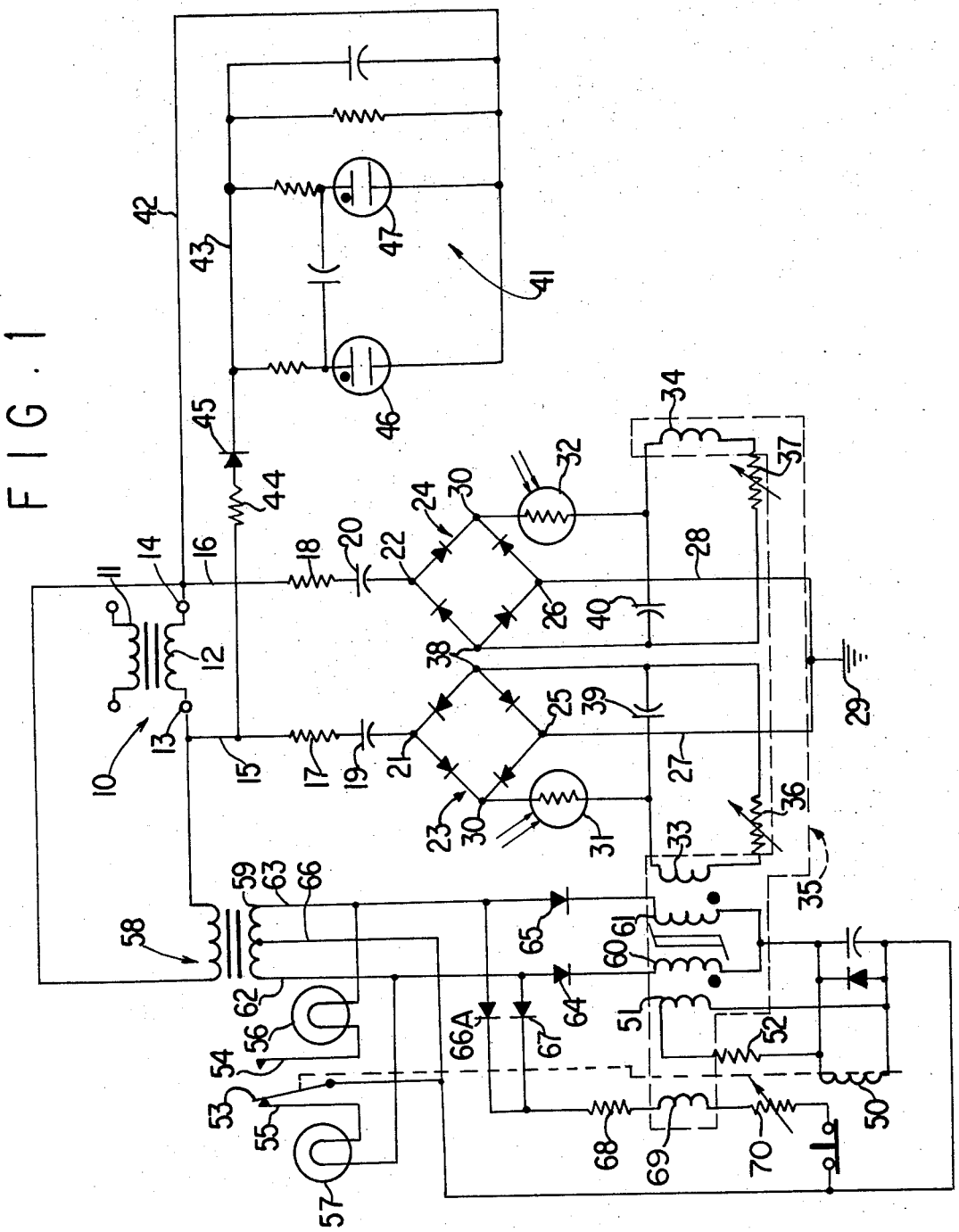
FIG. 1 is a schematic circuit diagram illustrating one embodiment of the leakage detector of the present invention.

Referring now to FIG. 1 of the drawings, there is shown an isolation transformer 10 having a primary 11 and a secondary 12. The primary 11 is adapted for connection to any of the usual AC power systems having a ground return while the secondary 12 has terminals 13 and 14 connected to isolated power lines (not shown). A pair of separate and independent detection circuits 15 and 16 are connected to the terminals 13 and 14 and each contain identical resistive-capacitive networks comprising resistors 17 and 18 and series connected capacitors 19 and 20. The capacitors 19 and 20 are connected to the top junctions 21 and 22 of rectifying bridges 23 and 24, the lower junctions 25 and 26 of which are connected to a ground 29 through lines 27 and 28. Junctions 30 of the bridges 23 and 24 are connected to photosensitive resistors 31 and 32 which in turn are connected to control windings 33 and 34 mounted on the core of a self saturating magnetic amplifier 35 indicated by dashed lines having positive feedback to provide a bistable mode of operation. The other side of the windings 33 and 34 are connected through variable resistors 36 and 37 to negative junctions 38 of bridges 23 and 24. Capacitors 39 and 40 shunt the windings 33 and 34 and the resistors 36 and 37 with the resistors 36 and 37 providing a balance adjustment for the detection circuits 15 and 16. The function of capacitors 39 and 40 is to follow the output of the bridges 23 and 24 and hold the charge past the dark cycle (nonconducting time) of elements 31 and 32 so that proper scanning of both fault-signal currents can be made by the magamp 35.

The photosensitive switching devices 31 and 32 comprise photosensitive resistors (commonly referred to as "photo cells") which have a very high resistance when unilluminated and a low resistance when illuminated. To provide for sequential operation of these switching devices, a free-running multivibrator 41 is connected to the terminals 13 and 14 by means of the lines 42 and 43, resistor 44, and diode 45. The multivibrator 41 is of a well-known construction and includes two neon lamps 46 and 47, one for each of the photosensitive devices 31 and 32, as a part of its operating circuitry. The multivibrator is set alternately to operate the lamps 46 and 47 at a rate of about once in every 100 msec. thereby effecting alternate sampling of the detection circuits.

The magnetic amplifier 35 operates an indicating relay 50 through a winding 51 and resistance 52. As shown, the magnetic amplifier 35 is connected so as normally to energize the relay 50 and is provided with positive feedback so as to operate in a bistable mode, i.e., when there is a fault signal in one of the windings 33 or 34, the relay is deenergized but becomes reenergized upon removal of the fault thereby to provide a fail-safe operation in case of circuit or component failure. The relay 50 operates a movable contact 53 which makes connection with a contact 54 when the relay is energized, thereby indicating no fault, and with a contact 55 when the relay is deenergized, thereby indicating a fault. Contact 54 operates one or more green lamp indicators 56 and contact 55 one or more red light indicators 57 and an audible signal (not shown in FIG. 1) all as more particularly described in connection with FIGS. 2 and 3.

A low-voltage source of power, in the order of 24 v. for example, is provided for the magnetic amplifier and the indicating system by a stepdown transformer 58 connected to the terminals 13 and 14 and having a secondary 59. The secondary 59 is connected to the driving windings 60 and 61 of the magnetic amplifier 35 by lines 62 and 63, diodes 64 and 65, and return line 66. The indicating system is directly connected to the lines 62, 63 and 66. Also connected to the lines 62 and 63 through diodes 66A and 67 and a resistor 68 is a sensitivity (bias) winding 69 for the magnetic amplifier. This circuit is controlled by a variable resistor 70, which sets the trip point.

The operation of the detector system as thus far described is believed to be self evident. Any leakage or fault current above a predetermined maximum, 2 ma. for example, through either or both isolation lines will be sequentially detected by the circuits 15 and 16 to cause a triggering voltage on magnetic amplifier 35 to trip signal-operating relay 50. The detection circuits are sequentially operated by the photosensitive elements 31 and 32 and multivibrator-operated lamps 46 and 47. Relay 50 provides for fail-safe operation of the nonfault and fault indicators. Variable resistors 36 and 37 provide for balancing adjustment of the detection circuits while variable resistor 70 provides for trip-point adjustment of the magnetic amplifier.

While the detector thus described relates to a pair of detection circuits connected to dual isolation lines, it can be readily converted into a three-phase system by adding a third control winding on the magnetic amplifier and a third detection network. A third element has to be added to the neon flasher to convert the circuit into a ring counter, operating in the sequence 1-2-3-1....

Figure 2:
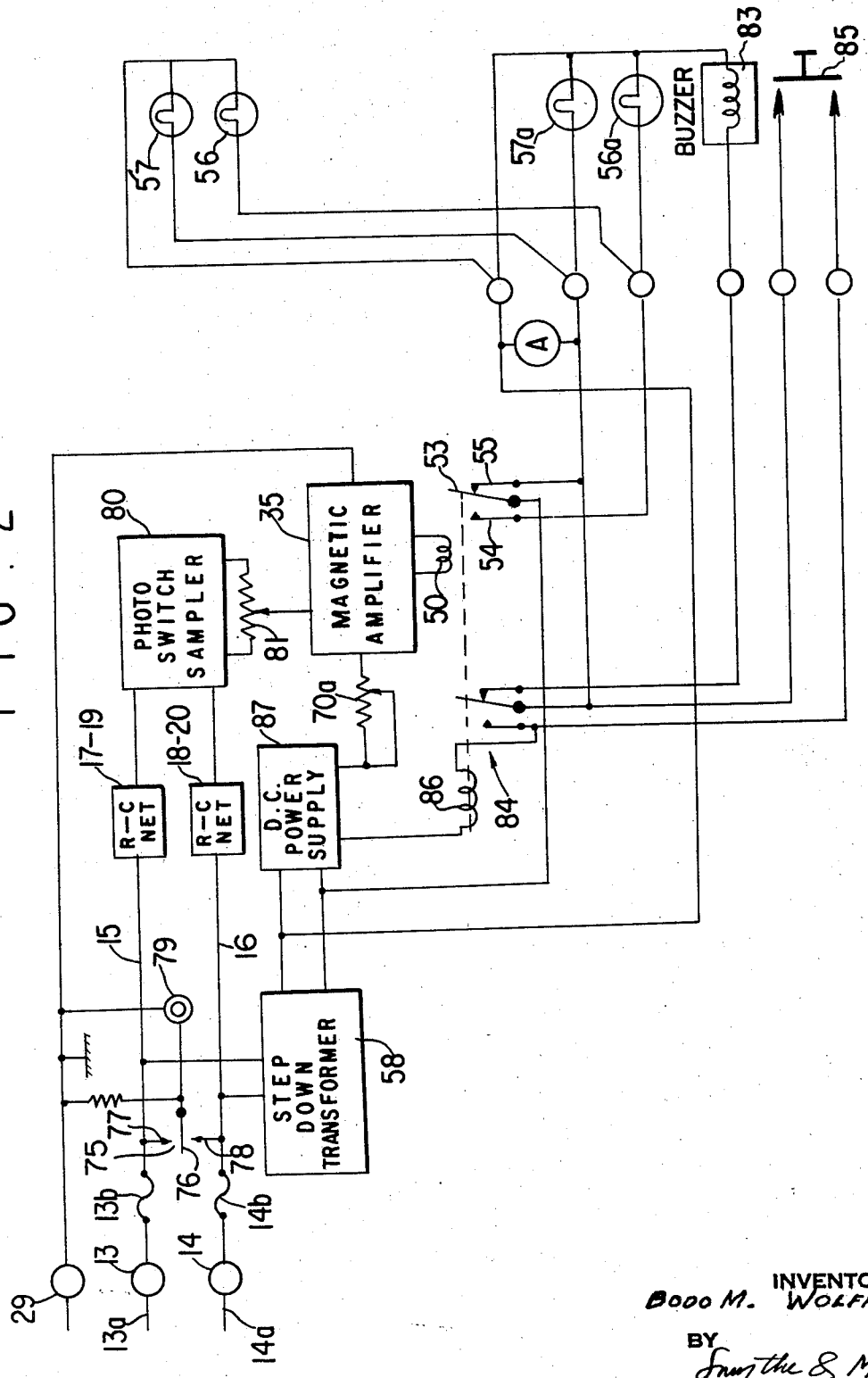
FIG. 2 is a block diagram illustrating a more sophisticated and somewhat modified embodiment of the invention.
Figure 3:
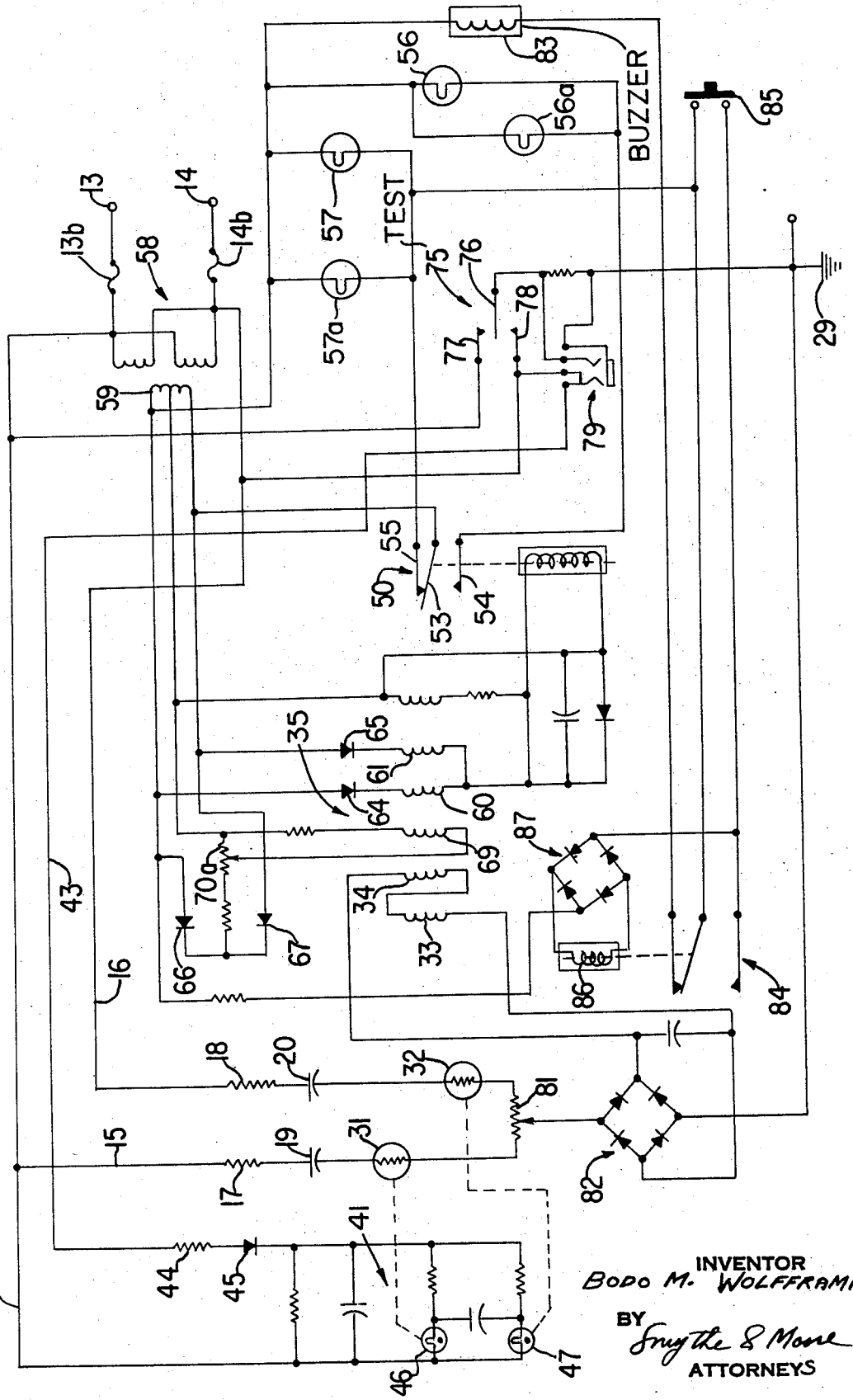
FIG. 3 is a schematic diagram of the detector of FIG. 2.

Referring now to the block and circuit diagrams of FIGS. 2 and 3 wherein the same reference numerals are employed as in FIG. 1 to the extent practicable, there are shown the terminals 13 and 14 which are connected to the secondary of the isolation transformer 10 of FIG. 1 and to the isolated lines 13a and 14a not shown in FIG. 1. Also connected between the terminals 13 and 14 and the detection circuits 15 and 16 are fuses 13b and 14b, a test switch 75 having a movable contact 76 and fixed contacts 77 and 78, and a meter-jack socket 79. Each of the detection circuits 15 and 16 contain the identical R-C networks 17—19 and 18—20 of FIG. 1 but in this embodiment the capacitors 19 and 20 are connected directly to the photosensitive switching devices 31 and 32 as indicated at 80 in FIG. 2 and a single potentiometer 81 provides for balance adjustment of the detection circuits 15 and 16. A single rectifying bridge 82 also connects the detection circuits to the ground 29 (FIG. 3) and to the control windings 33 and 34 (FIG. 3) of magnetic amplifier 35.

As in the circuit of FIG. 1, the magnetic amplifier 35 indicated by dashed lines is provided with driving windings 60 and 61 connected through diodes 64 and 65 to a stepdown transformer 58. As also shown in FIG. 1, the transformer 58 operates a bias winding 69 for the magnetic amplifier 35 through diodes 66 and 67 and potentiometer 70a. The magnetic amplifier again operates a normally energized relay 50 having a movable contact 53 and fixed contacts 54 and 55. In this embodiment, however, the relay 50 is shown as operating one or more green and red pilot lights 56a and 57a as well as remote indicating lights 56 and 57. The relay 50 also operates a buzzer 83 which gives an audible signal in the event of a fault. The buzzer 83 operates through the relay 50 and a second silencing relay 84 which is normally not energized, but may be latched to a silencing position by a pushbutton 85. Operation of pushbutton 85, however, continues illumination of the red fault lights 57 and 57a through the holding coil 86 of relay 84 until the fault is removed and relay 50 is again energized. A rectifying bridge 87 provides DC power to holding coil 86.

Again as in FIG. 1, the photosensitive devices 31 and 32 are alternately switched on and off by neon lamps 46 and 47 forming operative elements of a multivibrator 41 connected through lines 42 and 43, resistor 44, and diode 45 to the terminals 13 and 14.

The operation of the circuit of FIGS. 2 and 3 is substantially the same as in FIG. 1 except for the fact that the detection lines 15 and 16 are sequentially connected to ground through a single rectifying bridge 82. FIGS. 2 and 3 also disclose certain operative elements which are preferable but are not necessarily used with the system of FIG. 1.

While exemplary embodiments of the invention have been shown and described, it will be apparent that alterations, changes and modifications may be made without departing from the spirit of the invention, and it is intended to be limited only by the scope of the appended claims.

I claim:

1. A leakage current detector for isolated power lines which comprises a plurality of independent detection circuit means, one for each of said power lines, switching means for sequentially connecting each of said circuit means to ground-connecting means thereby sequentially to sample each of the detection circuits, a relay means for operating a fault-indicating signal, circuit means including a bistable means for operating said relay means, said bistable means comprising a magnetic amplifier having sufficient positive feedback to provide bistable operation from the output of the magnetic amplifier, and control means for triggering said bistable means connected in said ground-connecting means.

2. A leakage detector as defined in claim 1 in which said bistable means provides for energization of said relay means during periods of no leakage fault and deenergization of the relay means upon occurrence of a fault, thereby to provide a fail-safe operation of said relay means.

3. A leakage detector as defined in claim 2 in which said relay means includes a contact connected to a nonfault indicator circuit means upon energization of the relay and a contact for operating said fault-indicating signal upon deenergization of said relay.

4. A leakage detector as defined in claim 3 in which said fault-indicating signal comprises a lamp and an audible signal.

5. A leakage detector as defined in claim 1 in which r3ctifying bridge means control the flow of current through said control means and said ground connecting means.

6. A leakage detector as defined in claim 1 in which variable resistor means connected between said detection circuit means and said ground connecting means provides for balancing said independent detection circuit means.

7. A leakage detector as defined in claim 1 in which circuit means including coil means on said amplifier and a variable resistance provide trip-point control for said magnetic amplifier.

8. A leakage detector as defined in claim 1 in which said switching means comprises a plurality of photosensitive devices, one for each of said detection circuit means, and means including sequentially operated lamps provide for effecting conduction of said photosensitive devices.

9. A leakage detector as defined in claim 8 in which said lamps are of the neon type and comprise operative elements of a free-running multivibrator circuitry means.

10. A leakage detector as defined in claim 1 in which a rectifying bridge circuit is connected in each of said detection circuit means, one part of said bridge circuit being connected to said switching means and another part to said ground-connecting means.

11. A leakage detector as defined in claim 1 in which a rectifying bridge is connected in said ground-connecting means between said switching means and said control means.